(12) United States Patent
Lim et al.

(10) Patent No.: US 8,794,361 B2
(45) Date of Patent: Aug. 5, 2014

(54) COOLING STRUCTURE FOR ENVIRONMENTAL-FRIENDLY VEHICLE

(75) Inventors: Haekyu Lim, Seoul (KR); Yooncheol Jeon, Gyeonggi-do (KR); Yongjin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 335 days.

(21) Appl. No.: 13/281,623

(22) Filed: Oct. 26, 2011

(65) Prior Publication Data

US 2012/0318591 A1    Dec. 20, 2012

(30) Foreign Application Priority Data

Jun. 16, 2011   (KR) .................. 10-2011-0058536

(51) Int. Cl.
*B60K 1/04* (2006.01)
(52) U.S. Cl.
USPC ........................................ 180/68.1; 180/68.5
(58) Field of Classification Search
USPC ................................................ 180/68.1, 68.5
See application file for complete search history.

(56) References Cited

U.S. PATENT DOCUMENTS

| | | | |
|---|---|---|---|
| 7,688,582 B2 * | 3/2010 | Fukazu et al. ............... | 361/690 |
| 7,900,727 B2 * | 3/2011 | Shinmura ..................... | 180/68.1 |
| 2010/0089675 A1 * | 4/2010 | Nagata et al. ............... | 180/68.5 |

FOREIGN PATENT DOCUMENTS

| | | |
|---|---|---|
| JP | 2004-022267 A | 1/2004 |
| JP | 2005094928 A | 4/2005 |
| JP | 2007331689 A | 12/2007 |
| JP | 2009-154696 A | 7/2009 |
| KR | 1020060036694 A | 5/2006 |
| KR | 10-0633910 | 10/2006 |
| KR | 10-2006-0124862 | 12/2006 |
| KR | 10-0851121 | 8/2008 |

* cited by examiner

*Primary Examiner* — Katy M Ebner

(74) *Attorney, Agent, or Firm* — Edwards Wildman Palmer LLP; Peter F. Corless

(57) ABSTRACT

Disclosed is a battery cooling structure for an environmental-friendly vehicle. The battery cooling structure for the environmental-friendly vehicle includes a plurality of battery packs that supply power to a motor and are arranged in parallel so as to be spaced a predetermined distance from each other inside a tire well. An inflow duct is disposed to provide fluid communication and connection with the interior of the vehicle so that the air inside the vehicle is sucked into the inflow duct. A plurality of diverging ducts independently supply the air to the respective battery packs which are arranged and spaced a predetermined distance from each other on the downstream side of the inflow duct. A lower duct is disposed under the battery pack and joins diverging air flows, and a cooling fan is disposed on downstream side of the lower duct and is configured to discharge the air to the outside.

5 Claims, 6 Drawing Sheets

COOLING STRUCTURE FOR ENVIRONMENTAL-FRIENDLY VEHICLE

CROSS-REFERENCE TO RELATED APPLICATIONS

The present application claims priority to Korean Patent Application Number 10-2011-0058536 filed Jun. 16, 2011, the entire contents of which application is incorporated herein for all purposes by this reference.

BACKGROUND OF THE INVENTION

1. Field of the Invention

The present invention relates to a cooling structure for an environmental-friendly vehicle, and more particularly, to a cooling structure for an environmental-friendly vehicle which has a battery mounted in a tire well of a trunk thereof and supplies diverging cooling air to cool down the battery.

2. Description of Related Art

Environmentally-friendly vehicles such as electric vehicle or hybrid vehicles utilize a high voltage battery mounted therein to supply power to a motor serving as a power source thereof. Since the battery is mounted inside the environmental-friendly vehicle, the mounting position of the battery often takes up precious an interior space and thus the merchantable quality of the environmental-friendly vehicle is typically affected as a result. For example, the battery may be mounted over a rear floor inside a trunk.

In addition to taking up space, these batteries emit a significant amount of heat while being operated. Therefore, a technique for cooling down the battery is considered to be an important factor, as well. Conventionally, the battery is mounted inside the vehicle or on one side of the trunk, and, a separate cooling module is not provided, or the battery is simply cooled down through ventilation. In most cases, however, the battery cooling structure only include a duct for guiding air flow and a cooling fan for forcing or accelerating the air flow. Thus, the conventional cooling structures do not effective cool the batteries in these types of vehicles. Further, the interior space or trunk of the vehicle may be reduced by the space where the battery is mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a cooling structure for an environmental-friendly vehicle which includes a plurality of battery packs forming a battery for the environmental-friendly vehicle and arranged in parallel inside a tire well, which is configured to divide cooling air brought from the interior of the vehicle, and send/force the divided air flows over and through the respective battery packs via independent flow paths, thereby minimizing a pressure loss which occurs when the cooling air flows.

An exemplary embodiment of the present invention provides a battery cooling structure for an environmental-friendly vehicle, including a plurality of battery packs, an inflow duct, diverging ducts, a lower duct, and a cooling fan. The plurality of battery packs for supplying power to a motor are arranged in parallel so as to be spaced a predetermined distance from each other inside a tire well.

The inflow duct is disposed to provide fluid (e.g., air) communication with the interior of the vehicle such that the air inside the vehicle is brought into the inflow duct and subsequently flows over the battery packs. The diverging ducts, quantified in a number that is equal to that of battery packs, independently supply the air to the respective battery packs which are arranged and spaced from each other at a downstream side of the inflow duct. The lower duct is disposed under the battery pack and joins diverging air flows. The cooling fan is provided at also on the downstream side of the lower duct and discharges the air to the outside. The inflow duct may diverge in parallel to the diverging ducts connected to the respective battery packs.

In some embodiments of the present invention, the battery packs may be mounted at the front of the tire well inside a trunk and the inflow duct may be connected to a side surface of a rear seat of the vehicle.

A low voltage DC-DC converter (LDC) may be disposed on the back side of the cooling fan, and a discharge duct connected to a trunk may be provided on the back side of the LDC.

According to the exemplary embodiments of the present invention, the cooling air brought from the interior of the vehicle is divided and supplied to the respective battery modules. Therefore, a pressure drop depending on the air flow inside the duct may be minimized to effectively cool down the battery. In particular, the diverging ducts are arranged in parallel to supply the cooling air to the respective modules through the independent flow paths. Therefore, the introduced cooling air may be supplied to the respective battery modules without a temperature increase thereof. Accordingly, the cooling performance is improved.

Further, as the battery of the environmental-friendly vehicle is disposed in the front inside of the tire well, the space required for installing the battery may be minimized to secure the interior space of the vehicle and the internal space of the trunk. Therefore, it is possible to increase the merchantable quality of the environmental-friendly vehicle. In addition, as the structure including the battery and the ducts is provided in the rear portion of the vehicle, an impulse during a rear-end collision may be absorbed, which makes it possible to secure the stability of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
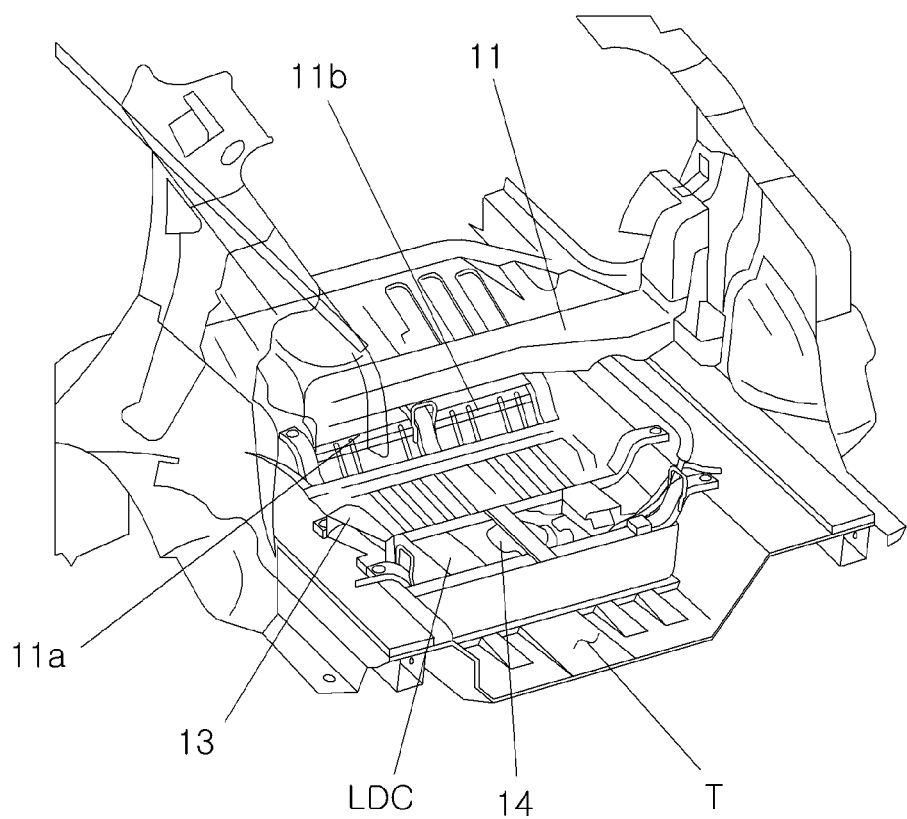
FIGS. 1 and 2 are perspective views of a battery cooling structure for an environmental-friendly vehicle according to an exemplary embodiment of the present invention.
Figure 2:
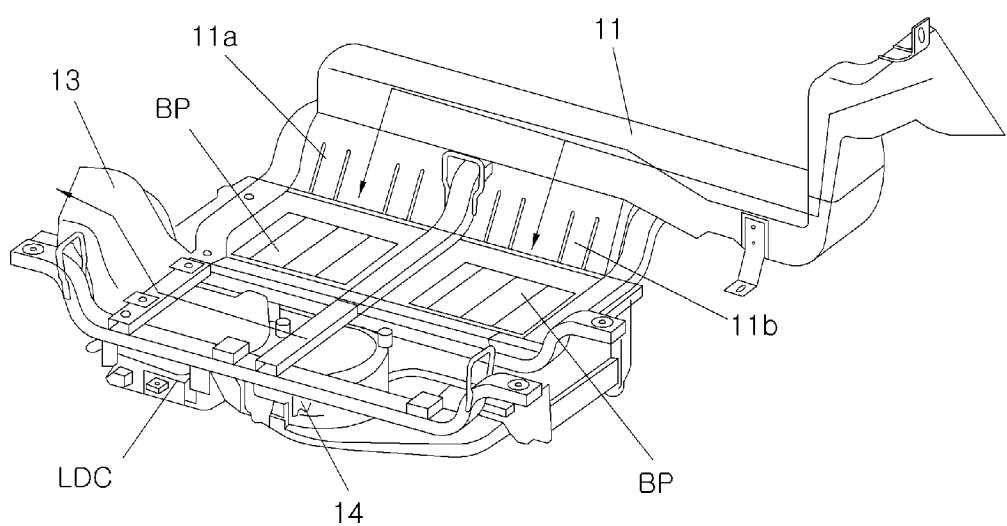
Figure 3:
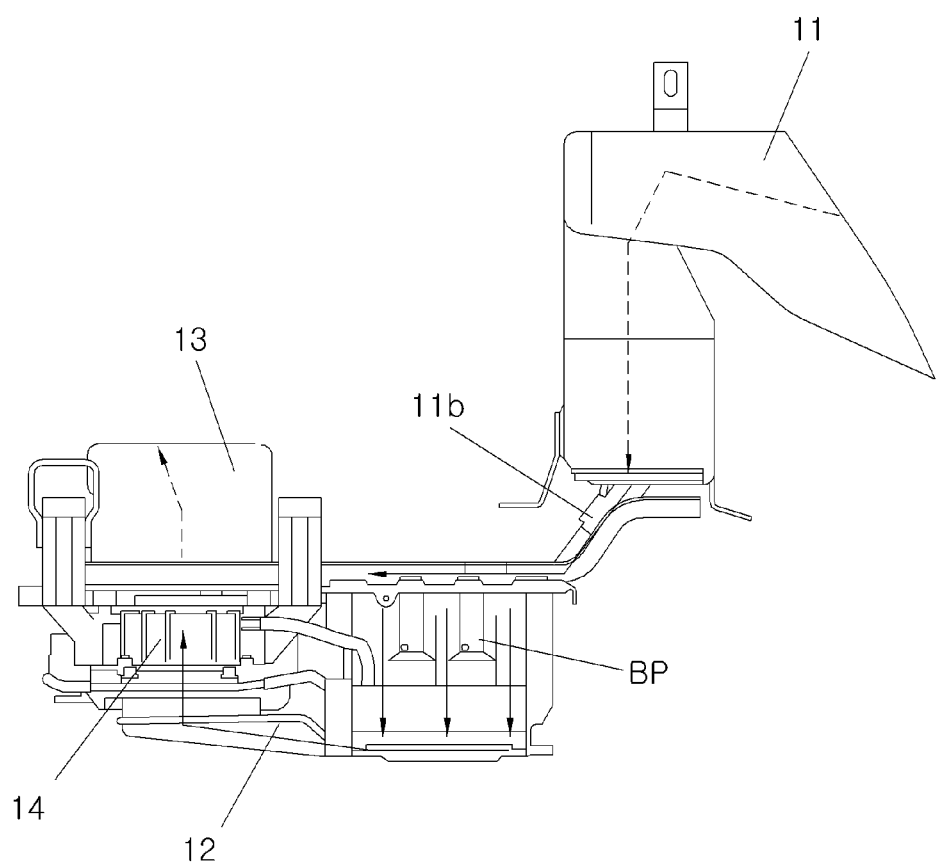
FIG. 3 is a right side view of the battery cooling structure for the environmental-friendly vehicle according to an exemplary embodiment of the present invention.
Figure 4:
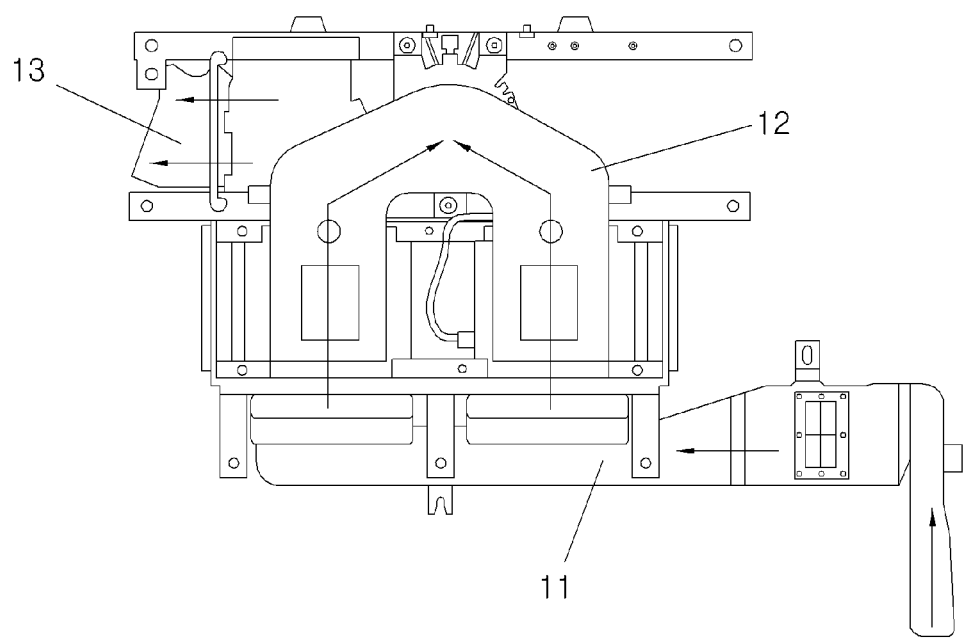
FIG. 4 is a bottom view of the battery cooling structure for the environmental-friendly vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum) which require a battery to operate or provide power to a motor in the vehicle. As referred to herein, a hybrid vehicle is a vehicle that has two or more sources of power, for example both gasoline-powered and electric-powered vehicles.

Referring to FIGS. 1 to 5, a battery cooling structure for an environmental-friendly vehicle according to an exemplary embodiment of the present invention includes a plurality of battery modules, an inflow duct 11, diverging ducts 11a and 11b, a lower duct 12, a discharge duct 13, and a cooling fan 14. The plurality of battery modules are arranged at the front of a tire well inside a trunk. The inflow duct 11 is connected to the interior of the vehicle, the diverging ducts 11a and 11b diverge to respective battery packs BP in parallel, the lower duct 12 is provided under inflow duct 11 to join cooling air passing through respective battery packs BP, and the cooling fan 13 forces or effectuates the air to flow.

In the battery cooling structure for the environmental-friendly vehicle according to the exemplary embodiment of the present invention, the battery for supplying power to a motor includes a plurality of battery packs BP mounted inside the tire well of the vehicle. Since a trunk of the vehicle includes the tire well for mounting a spare tire, the internal space of the tire well may be utilized to mount the battery modules. In particular, the battery modules may be mounted at the front of the inside of the tire well such that the battery modules and the spare tire are mounted inside the tire well in combination.

The inflow duct 11 is provided to communicate with the interior of the vehicle. One side of the inflow duct 11 is positioned at the interior of the vehicle, and the other side of the inflow duct 11 is connected to the battery packs BP. Accordingly, the inflow duct 11 serves as a path communicating between and connecting the interior of the vehicle and battery packs BP.

Figure 5:
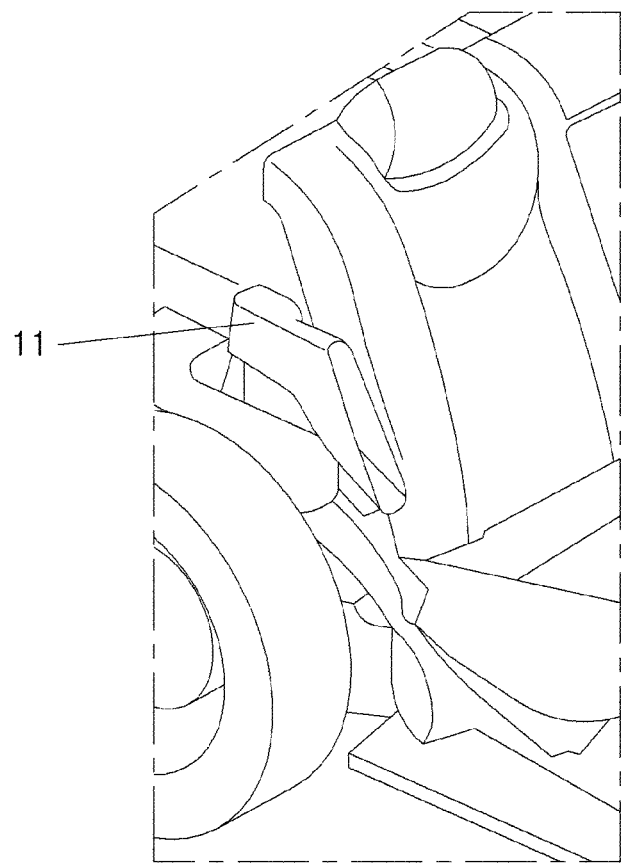
FIG. 5 is a perspective view illustrating the position of an inflow duct in the battery cooling structure for the environmental-friendly vehicle according to an exemplary embodiment of the present invention.

Referring to FIG. 5, the one side of the inflow duct 11 may be positioned on a side surface of a rear seat such that the air is brought from the interior of the vehicle. Alternatively, the one side of the inflow duct 11 may be positioned at a rear package of the rear seat or under the rear seat.

The diverging ducts 11a and 11b have one side connected to the downstream side of the inflow duct 11 and the other side connected to the battery packs. The diverging ducts 11a and 11b form independent flow paths to respective battery packs BP such that the air brought from the interior of the vehicle may be supplied to battery packs BP. The number of diverging ducts may be set to be equal to the number of battery packs BP mounted inside the tire well T. That is, referring to FIG. 2, when two battery packs BP are mounted, diverging ducts 11a and 11b diverge into both of the left and right sides, respectively.

Meanwhile, when the air brought into the inflow duct 11 is supplied to battery packs BP through the diverging ducts 11a and 11B, the air flow supplied to battery packs BP may diverge in parallel to each other. Therefore, a flow loss depending on a pressure drop inside the duct may be prevented, and the air brought from the interior of the vehicle may be directly supplied to battery packs BP.

For example, a plurality of battery packs BP may be mounted and positioned inside one duct so as to be arranged in series inside the duct. In this case, a pressure drop may occur at a battery pack positioned at the downstream side of an air flow, and thus cooling performance decreases. Furthermore, since the battery pack positioned at the downstream side comes in contact with air which is heat-exchanged with a battery pack positioned at the upstream side of the air flow, the cooling performance further decreases.

According to the exemplary embodiment, however, the air brought from outside is supplied while diverging in parallel. Therefore, a pressure drop inside the flow path does not occur. Furthermore, since the air is supplied to the respective battery packs in a state in which the temperature of the air brought from outside is maintained, the cooling performance is improved.

The lower duct 12 serves to join the air flows diverging through diverging ducts 11a and 11b. The lower duct 12 includes the same number of upper portions as that of battery packs BP, and the upper portions form one flow path therethrough. Therefore, as respective battery packs BP are provided between the diverging ducts 11a and 11b and the lower duct 12, the air supplied from the diverging ducts 11a and 11b cools down battery packs BP and is then discharged through the lower duct 12.

The cooling fan 14 is installed in such a manner as to be connected to the downstream side of the lower duct 12. The cooling fan 14 forces/effectuates the air to flow inside the inflow duct 11, the diverging ducts 11a and 11b, and the lower duct 12. The air is then discharged to the outside by the cooling fan 14. In particular, as cooling fan 14 is not installed within the inflow duct 11 or the diverging ducts 11a and 11b, but instead is preferably installed on the downstream side of the lower duct 12 to prevent noise caused by the operation of cooling fan 13 from being transmitted to the interior of the vehicle as much as possible.

The discharge duct 13 is positioned on the back side of the cooling fan 14 to discharge the air having cooled down and passed over the battery packs to the trunk. The discharge duct 13 has one side connected to the cooling fan 14 and the other side positioned in the trunk so that the air discharged from the discharge duct 14 is brought into the trunk and then discharged to the outside through a discharge grill of the trunk. In this case, a high-voltage part such as a low voltage DC-DC converter (LDC) may be disposed between the cooling fan 14 and the discharge duct 13. Then, the air discharged from cooling fan 14 may cool down the high-voltage part as well.

Now, the operation of the battery cooling structure for the environmental-friendly vehicle according to the exemplary embodiment of the present invention will be described.

As the battery modules mounted in the tire well supply power to the motor, heat is inevitably generated. In order to cool down the battery modules, the cooling fan 14 is operated to supply the air from the interior of the vehicle to the battery packs. When the cooling fan 14 is operated, the air from the interior of the vehicle is sucked through the inflow duct 11. The air having passed through the inflow duct 11 diverges through the diverging ducts 11a and 11b and is then supplied to the respective battery packs. Since the air brought through the inflow duct 11 is directly supplied to the respective battery packs BP, the air supplied to one battery pack is supplied in a state in which the air comes in contact with only one of the battery packs. Therefore, the cooling performance is improved.

Figure 6:
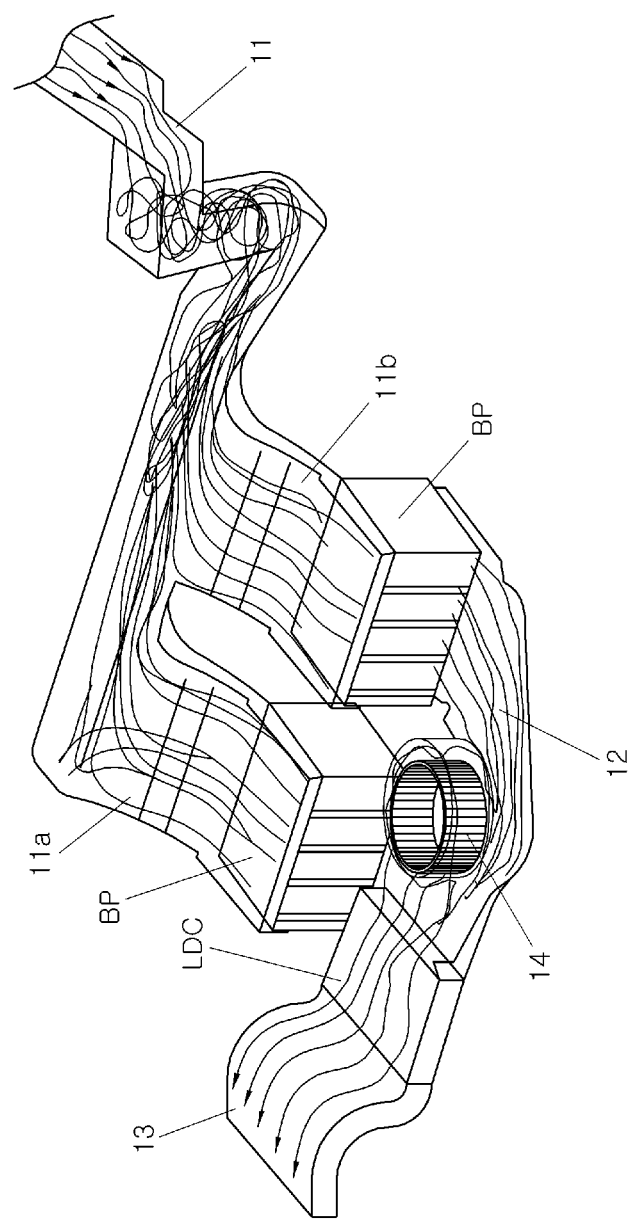
FIG. 6 is a diagram illustrating air flows by the battery cooling structure for the environmental-friendly vehicle according to an exemplary embodiment of the present invention.

Furthermore, referring to FIG. 6, the overall air flow in the battery cooling structure for the environmental-friendly vehicle according to the exemplary embodiment of the present invention is supplied in the following manner: the air supplied to the inflow duct 11 diverges in parallel, and the diverging air flows are independently supplied to the respective battery packs without being mixed. Therefore, it is possible to reduce a pressure loss which may occur as the flow path is lengthened. Accordingly, a sufficient amount of air required for cooling may be supplied, which makes it possible to improve the cooling performance.

When the air is supplied to the respective battery packs from the diverging ducts 11a and 11b, the heated battery packs BP are cooled down, and the air is brought into the lower duct 12. The lower duct 12 joins the diverging air flows to discharge to the outside. The air discharged from the lower duct 12 is passed over the high-voltage part such as an LDC through the cooling fan 14, and cools down the high-voltage part heated by the operation. The air having cooled down the battery packs BP and the high-voltage part is discharged to the trunk through the discharge duct 13, and then discharged to the outside of the vehicle through the discharge grill of the trunk.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery cooling structure for an environmental-friendly vehicle, comprising:
   a plurality of battery packs configured to supply power to a motor and arranged in parallel so as to be spaced a predetermined distance from each other inside a tire well;
   an inflow duct disposed to provide fluid communication and connection with the interior of the vehicle such that the air inside the vehicle is sucked into the inflow duct;
   a plurality of diverging ducts of which the number is equal to that of a number of battery packs, independently supplying the air to the respective battery packs which are arranged and spaced a predetermined distance from each other on a downstream side of the inflow duct, wherein the plurality of diverging ducts are formed from divergence of the inflow duct upstream from the plurality of battery packs so that an inlet and an outlet of each diverging duct are both upstream from the respective battery packs;
   a lower duct disposed under the battery pack and configured to join diverging air flows; and
   a cooling fan provided on the downstream side of the lower duct and configured to discharge the air to the outside.

2. The battery cooling structure as defined in claim 1, wherein the plurality of diverging ducts connected to the respective battery packs are arranged in parallel.

3. The battery cooling structure as defined in claim 1, wherein the battery packs are mounted on a front portion of the tire well inside a trunk.

4. The battery cooling structure as defined in claim 1, wherein the inflow duct is connected to a side surface of a rear seat of the vehicle.

5. The battery cooling structure as defined in claim 1, wherein a low voltage DC-DC converter (LDC) is disposed on the backside of the cooling fan, and a discharge duct connected to a trunk is provided behind the LDC.

* * * * *